United States Patent
Gotman et al.

(10) Patent No.: US 8,406,330 B2
(45) Date of Patent: Mar. 26, 2013

(54) ADVANCED LLR PROCESSOR FOR WIRELESS TELECOMMUNICATION SYSTEM

(75) Inventors: Maxim Gotman, Kfar Saba (IL); Meir Tsadik, Hod Hasharon (IL); Eran Richardson, Petah Tikva (IL); Assaf Touboul, Natanya (IL)

(73) Assignee: Qualcomm Incorporated, San Diego, CA (US)

( * ) Notice: Subject to any disclaimer, the term of this patent is extended or adjusted under 35 U.S.C. 154(b) by 1 day.

(21) Appl. No.: 12/838,527

(22) Filed: Jul. 19, 2010

(65) Prior Publication Data
US 2012/0014478 A1  Jan. 19, 2012

(51) Int. Cl.
 H04L 5/12 (2006.01)
 H04L 23/02 (2006.01)
(52) U.S. Cl. ........ 375/262; 375/265; 375/261; 375/341; 714/702; 714/795
(58) Field of Classification Search ............ 375/261, 375/262, 265, 340, 341, 349, 343; 714/702, 714/795
See application file for complete search history.

(56) References Cited

U.S. PATENT DOCUMENTS

2005/0193308 A1  9/2005 Shin
2007/0118786 A1  5/2007 Lim et al.
2009/0249134 A1*  10/2009 RostamPisheh et al. ..... 714/702

FOREIGN PATENT DOCUMENTS

EP  2410686 A2  1/2012
WO  2009120546 A1  10/2009

OTHER PUBLICATIONS

Gotman et al., Israel Patent Application No. 214155, entitled "Advanced LLR Processor for Wireless Telecommunication System," dated Jul. 18, 2011, 28 pgs.

* cited by examiner

Primary Examiner — Phuong Phu

(57) ABSTRACT

A method and system for processing LLRs, in a receiver, of transmissions over a wireless telecommunication system, the method including receiving multiple soft symbols, selecting a set of appropriate instructions for LLR calculation for the soft symbols, arranging the soft symbols in a register of a processor according to the selected instructions, selecting an appropriate single instruction from the set of instructions to be implemented by the processor using the soft symbols in the register as operands, and calculating, by a computation unit, multiple LLR values for the multiple soft symbols, in parallel, by means of the selected instruction.

20 Claims, 3 Drawing Sheets

$k = \log_2(M)$, where for
M=2 (BPSK) only $L_0(i)$ are used
M=4 (QPSK) only $L_0(i), L_4(i)$ are used,
M=16 (16QAM) $L_0(i), L_1(i), L_4(i), L_5(i)$ are used,
M=64 (64QAM) $L_0(i), L_1(i), L_2(i), L_4(i), L_5(i), L_6(i)$ are used,
M=256 (256QAM) $L_0(i)$ to $L_7(i)$ are used,

ADVANCED LLR PROCESSOR FOR WIRELESS TELECOMMUNICATION SYSTEM

FIELD OF THE INVENTION

The present invention relates to wireless telecommunications systems, in general and, in particular, to a method and system for computation of log-likelihood ratios (LLR), optionally with soft-combining of LLRs during decoding of Hybrid Automatic Repeat-reQuest (HARQ) messages in the receiver.

BACKGROUND OF THE INVENTION

Any modern communication system, especially a wireless commutation system, in order to provide acceptable performance in terms of packet error rate (PER) over fading communications channels, makes use of advanced forward error correction (FEC) schemes. These schemes may include simple traditional convolutional codes and block codes, or a combination of both, or, more recently, turbo codes (either convolutional or block) and low-density parity-check (LDPC) codes. All the coding schemes, though in different ways, process a bit-stream payload message (usually, of some predefined length k or a range of lengths $\{k_i\}$) to be transmitted and generate a new longer message, or a codeword, of length N, containing the original payload message and (N−k) additional parity bits as the encoding function of the original message. Accordingly, the entire theoretically available number of possible received codewords of length N is $2^N$ and, on the other hand, the number of different possibilities of transmitted codeword is only $2^k$. Since $2^k \ll 2^N$, the decoder exploits the additional knowledge, provided by the redundant bits indexed between k+1 and N−k, to improve the recovery of the sent payload.

The aforementioned code schemes differ from the point of view of their encoding rules, decoding algorithms, and PER (Packet Error Rate) performance. One common point of all the different algorithms implemented by modern decoders, regardless of the coding type, is that they are soft-input soft-output (SISO) based. In other words, each transmitted 'hard' bit of the codeword is represented in the receiver by a number of bits of width D>1, often called a 'soft bit'. A 'soft bit' represents some probabilistic information reflecting the likelihood of the corresponding 'hard' bit to be equal to '1' or '0', and is usually computed as the logarithm of the likelihood ratio (LLR), $\ln[p(1)/p(0)]$, where ln represents the natural (base e) logarithmic function, and p(1) and p(0) are the probabilities for the bit to be respectively '1' or '0'. Any SISO FEC decoder receives an input stream of LLR values (soft bits), and produces a decoded stream of 'hard' bits that it believes to be equal to the transmitted payload message.

In modern communication systems, Quadrature Amplitude Modulation (QAM) is implemented. In this modulation, the bits to be transmitted are mapped to channel symbols in a modulation mapper, each group of bits to a distinct symbol. Each such symbol represents one of a preset number of possible states (hereinafter 'M'), and is mapped onto a carrier signal. The number of bits included in each symbol equals the log of the sum of the different possibilities in the constellation diagram of the modulation scheme (hereinafter $k=\log_2(M)$). For example, a symbol in the QPSK modulation scheme includes 2 bits, since QPSK allows for 4 states. Similarly, a symbol in the 16QAM scheme includes 4 bits which is the log of the 16 possible states, a symbol in the 64QAM scheme includes 6 bits, and a symbol in the 256QAM includes 8 bits.

Typically, mapping $k=\log_2(M)$ bits to an M-QAM symbol is integrated with the Bit-Interleaved Coded Modulation (BICM), where the k bits are interleaved in some way. Following the interleaving, half of the k bits are mapped on the real component of the symbol, while the other half are mapped on the imaginary component. In this way, each of the k-bits modulates only one of the components, either in-phase or quadrature. In the receiver, the received symbol is converted to a total of k LLR values, each corresponding to one of the k transmitted bits. In the receiver, most of the demodulation processing is run at the symbols rate, which is k times slower than the bit-rate. The situation changes at the point where the demodulated soft symbols are converted into soft bits, which are to be produced at the bit-rate. Thus, in order to output a payload complying with high data rates dictated by bit rates, the receiver must include strong calculating capabilities. For example, if the required output payload is 600 Mbit per second, the receiver must compute at least 600 Mega LLR values per second. However, since k FEC redundant bits are usually appended to each codeword, the actual rate of LLR values to be computed grows by a factor which is the inverse of the coding rate. For example, if each N bits of payload are appended with k=2N redundant bits, the coding rate is $R=N/(N+k)=\frac{1}{3}$. Thus, if the net throughput is 600 Mbps, the gross bit rate becomes 1.8 Gbps, if all the bits are transmitted over the air, and the receiver must produce LLR values at this rate. In practice though, when a very low coding rate is used, this usually implies bad link conditions, thus, maximum throughput couldn't be achieved. Yet, even moderate coding rates, for example, $\frac{3}{4} < R < 1$ require an output payload of 600-800 Mbit per second.

Calculation of each LLR value involves a set of instructions, such as an arithmetic instruction, a logic instruction, a data instruction, or a control flow instruction, each of which is represented by a number, or sequence of numbers. Typically, computing each LLR value requires 10 instructions or more, thus, the processor carrying out these instructions must perform between 6 and 8 Giga instructions per second. Due to the very high bit rate of the data being transmitted, dedicated hardware is typically employed to implement these LLR calculations.

In order to improve the reliability of wireless links, HARQ combining has been recently widely adopted in the industry. HARQ combining is a key technology in next generation wireless systems that spans both MAC and PHY layers, and exploits time/frequency diversity and coding gain. In the HARQ combining scheme, incorrectly received codewords are stored at the receiver rather than discarded, and when the retransmitted codeword is received, the two words are combined. While it is possible that when independently decoded, two given transmissions cannot be decoded error-free, it may happen that the combination of all the erroneously received transmissions gives enough information to correctly decode the message. There are two main methods of re-combining in HARQ:

Chase combining: every retransmission contains the same information (data and parity bits) and contributes more signal power;

Incremental redundancy: every retransmission contains some different information than the previous one. At every retransmission, the receiver gains knowledge of extra information.

However, HARQ combining requires an additional set of instructions, which increases the need for strong processing abilities in the processor.

In addition, in modern communication protocols, such as, but not limited to, the 3GPP LTE standard, both HARQ combining approaches are dynamically applied. In receivers implementing these interchanging protocols, a very flexible retransmission and rate matching algorithm is adopted, where every retransmission version of a codeword can consist of both already transmitted bits and bits that are transmitted for the first time. A requirement for flexibility when utilizing HARQ combining thus arises, which typically would be answered by utilizing software. On the other hand, since the LLR computation and HARQ combining are performed on soft bits rather than on soft symbols, the receiver must be configured to sustain high bit rates. Traditionally, providing the ability to sustain higher bit rate is carried out by a hardware-oriented implementation, which would be much more efficient from the point of view of required silicon area and consumed power at the expense of flexibility, compared to a software-based solution.

Accordingly, there is a long felt need for a flexible solution for high rate LLR computation, and it will be very desirable to have such a solution that will also allow HARQ combining and additional calculations.

SUMMARY OF THE INVENTION

The present invention relates to a wireless telecommunication system and method for LLR computation in the receiver.

There is provided, according to the present invention, a programmable two-dimensional single-instruction multiple-data (2D-SIMD) processor for LLR computation, preferably for joint LLR computation and HARQ combining and, most preferably, also performing descrambling. The 2D-SIMD processor includes a set of software instructions supporting efficient operation of the processor and allowing the processor to compute LLR values in accordance with a plurality of protocols.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a method and system for wireless telecommunication providing efficient (fast) yet flexible implementation of LLR computation, in particular, when also implementing HARQ combining, and preferably, descrambling and deinterleaving, as well.

The system includes a programmable processor or microcontroller, preferably a digital signal processor (DSP), having a SIMD (single instruction multiple data) architecture, preferably 2 dimensional, allowing manipulation of multiple data with a single instruction. The processor may be a general purpose processor or a dedicated processor designed for these calculations. The SIMD architecture includes at least one internal register, configured for storing a plurality of soft symbols and soft bits extracted from these symbols, and at least one computation unit capable of performing multiple LLR computations in one cycle. Preferably, the internal register includes multiple instances, for a pipelined operation.

According to some embodiments, the processor further includes at least one additional computation unit for performing additional calculations on the resulting LLRs, such as, deinterleaving, descrambling, and/or HARQ combining and rate matching. Preferably, each such computation unit is configured to execute these calculations performed on a plurality of LLR values in one cycle.

The present invention further includes a management program for dictating the calculations to be performed by each of the computation units, and for dictating the size of each calculated soft bit. The management program is a special set of software instructions (assembly or higher level language) supporting efficient operation of the above mentioned processor. This management program shall be defined along with appropriate software tools (compiler, linker) to translate these instructions into machine micro-code.

Figure 1:
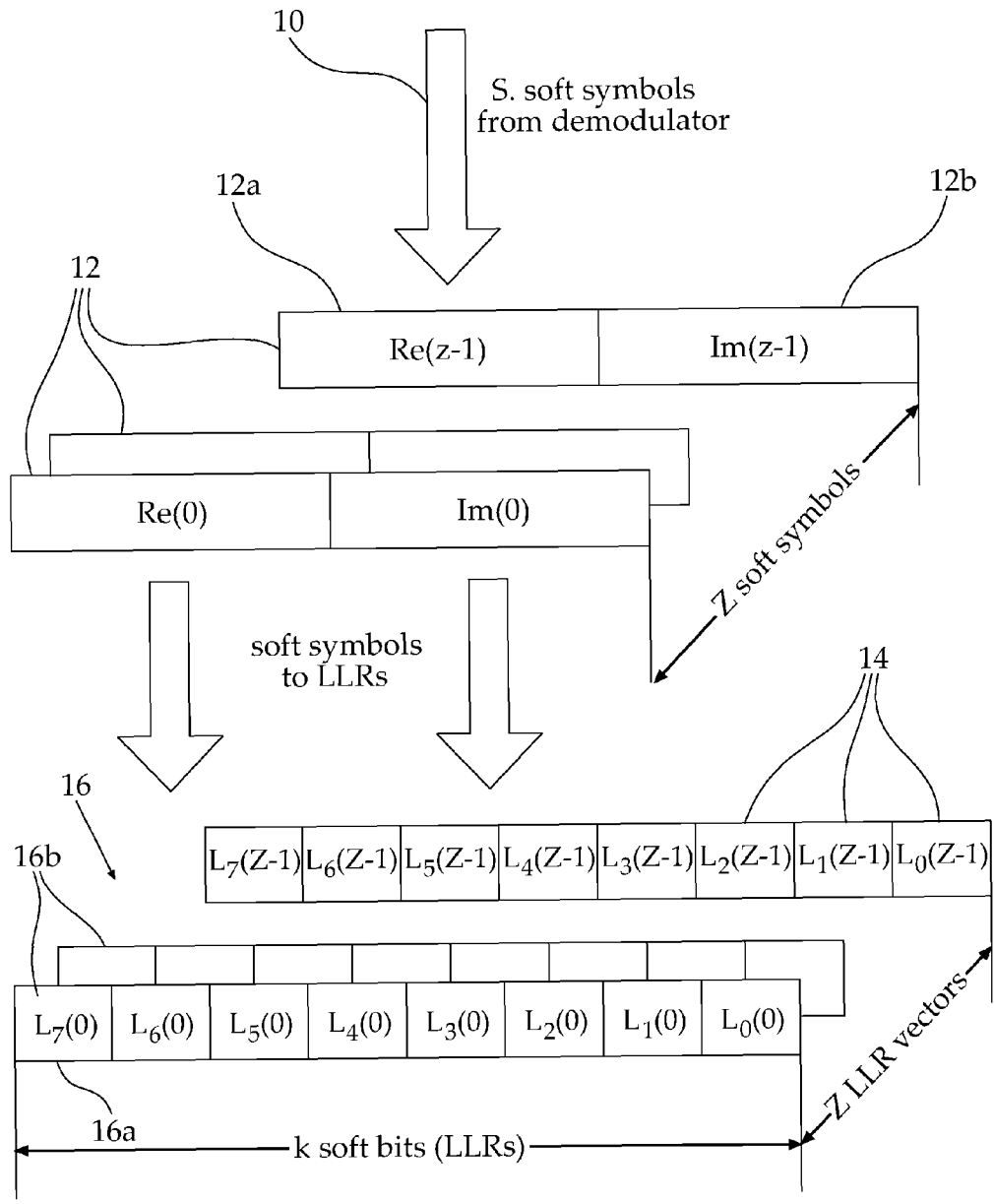
FIG. 1 is a schematic illustration of 2D-SIMD data types, according to some embodiments of the invention.

In order to allow computation of the LLR values of all the symbols received in one cycle, the received symbols are stored in a two dimensional virtual arrangement. In M-QAM modulation, $k=\log_2(M)$ bits are mapped to an M-QAM symbol, having a real component and an imaginary component. As shown in FIG. 1, when symbols 10 are received in the receiver, the demodulator output is grouped in batches of Z soft symbols 12, each symbol including a real component 12a, and an imaginary component 12b. The bits of fixed-point representation of real component 12a and imaginary component 12b of all the received symbols are arranged in a virtual two dimensional arrangement, where the bits are arranged in columns and the symbols are arranged in rows.

Since any given retransmission of the codeword uses a constant a-priori known modulation level (i.e., a constant number of bits per symbol, k), the operation of converting received soft symbols to LLR values is uniform across all the soft symbols and can be performed in parallel on several soft symbols. Thus, a single set of calculations required for computing k LLR values is applied to each of the Z received soft symbols, in parallel.

Applying this set of calculations results in k LLR values 14 extracted from each of the Z soft symbols, corresponding to the k bits mapped in each transmitted symbol. As stated above, when a Quadrature Amplitude Modulation (QAM) scheme is implemented, $k=\log_2(M)$, thus, in QPSK k=2, in 16QAM k=4, in 64QAM k=6, and in 256QAM k=8.

The kZ LLR values are arranged in a virtual matrix 16 having k columns 16a and Z rows 16b of LLR vectors, to permit applying further calculations to the kZ LLR values in parallel, for instance, HARQ combining and/or descrambling.

Applying this set of calculations is carried out by performing a plurality of instructions. Pipelining these instructions results in a significant time saving, and allows the processor to output more LLR values per second. It is a particular feature of the present invention that these instructions are performed on a plurality of values in parallel, thus, each instruction is fetched, decoded, executed, and writebacked one time for the entire data block and not each time for each value in the data block.

Thus, in this arrangement kZ LLR calculations are carried out in parallel, allowing the receiver to output a payload having the required data rate, and the processing factor (i.e., the number of instructions required in each cycle) does not cause a decrease in the data rate.

For example, if the payload bit rate required is 600 Mbit per second, and 10 instructions per second are required for extracting a single LLR value, the receiver according to the present invention applies the 10 instructions in parallel on Z soft symbols, each having k LLR values. Thus, the receiver does not have to process 6G instructions per second (IPS) but rather 6G/(Zk) IPS. Assuming, in this example, that 256QAM is used and assuming that the processor can receive 4 soft symbols in parallel, then kZ=32. Thus, only 6G/32=187.5M IPS are able to produce the required 600M LLRs per second, which is easily achievable with existing technology (which enables running processors at multi-mega- and even giga-Hz clocks).

It is a particular feature of the present invention that, due to the use of a management program controlling the operation of the processor, the flexibility of the LLR computation and HARQ combining module is retained. That is to say, that the dimensions of the two dimensional architecture are flexible, and the calculations applied to the two dimensional data can be automatically manipulated. Accordingly, the receiver allows for flexibility in the following parameters:

Actual function for converting soft symbols to soft bits (LLRs), using an efficient general processor's multiply-accumulate (MAC) SIMD instructions, parallel look-up multiport tables, or a combination thereof;

Modulation size, M;

LLR bit-width, D;

BICM law (e.g., in WiMAX, the $1^{st}$ k/2 bits are mapped to in-phase, then the remaining k/2—to quadrature, while in LTE the k2 even bits go to in-phase then the remainder, i.e. the k/2 odd bits, go to quadrature components);

Scrambling sequence;

HARQ combining method and weighting factors, that can vary with the resolution of a single LLR value.

It will be appreciated that the receiver may be configured to identify the protocol in which the symbol is sent, and thus, the management program can automatically define the dimensions and the calculations to be implemented on the symbol. For example, each symbol may be sent together with a control code including data regarding the protocol in which the symbol is sent.

Figure 2:
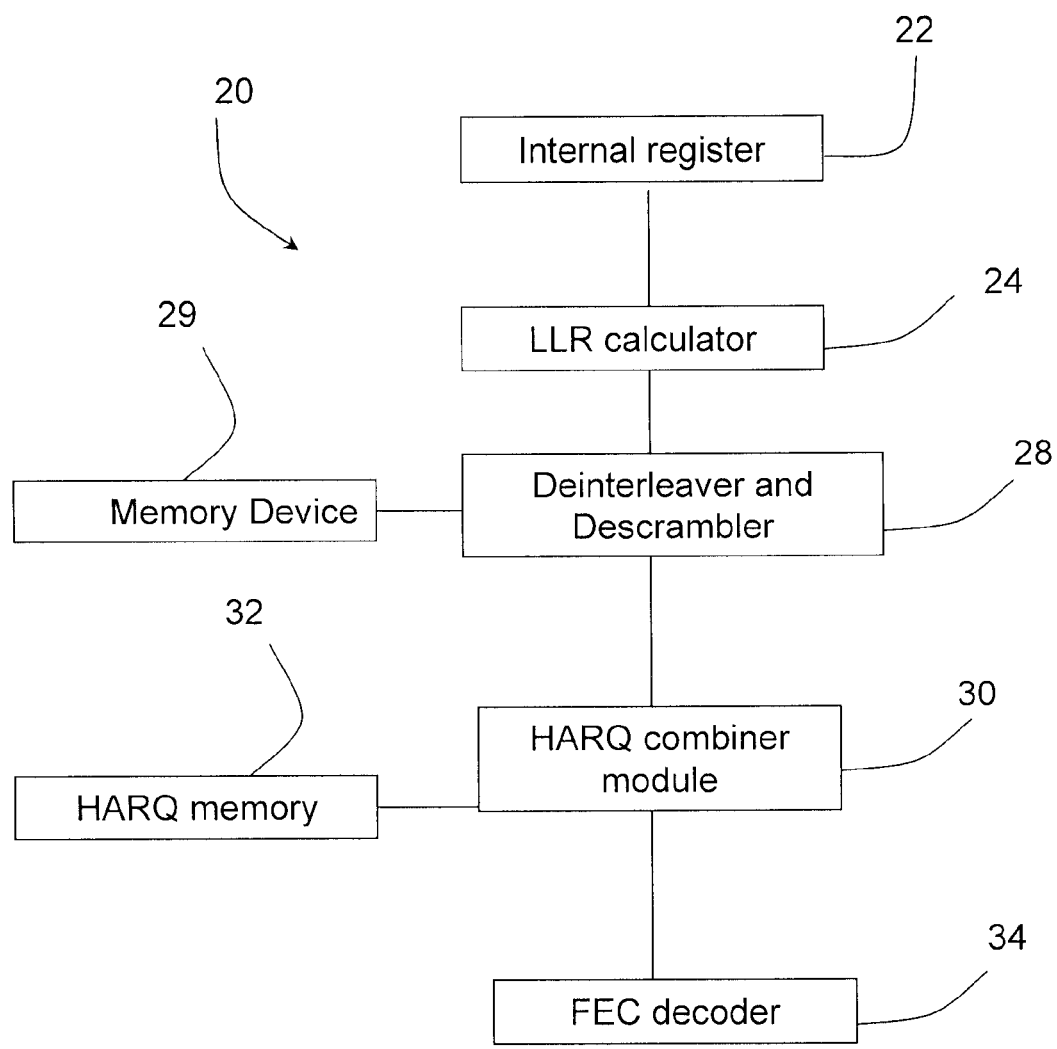
FIG. 2 is a block diagram illustration of a combined LLR computation, descrambler and HARQ combining module, constructed and operative in accordance with one embodiment of the present invention.

FIG. 2 is a block diagram illustrating a combined LLR computation, descrambler and HARQ combining module 20, constructed and operative in accordance with one embodiment of the present invention. Module 20 includes an internal register 22 for temporarily storing a plurality of deinterleaved soft symbols. Module 20 further includes an LLR calculator 24 coupled to internal register 22 and configured to compute the LLR values from each soft symbol in the internal register. Computing the LLR values may be carried out by utilizing a look up table having pre-computed LLR values. Alternatively, computing the LLR values is carried out by computation units performing real-time calculations in accordance with a pre-coded LLR computation function (e.g., programmer's code).

Preferably, the computation units can perform calculations corresponding to more than one LLR computation function. Selecting between the different functions can be carried out by a management program controlling the operation of module 20, according to the particular transmission protocol.

In addition, module 20 includes a joint deinterleaver and descrambler 28, coupled to the LLR calculator 24. Joint deinterleaver and descrambler 28 applies a modified scrambling sequence on each bit of the LLR values. According to one embodiment, the modified scrambling sequence is generated in real time. According to another embodiment, the modified scrambling sequence is stored in a memory device 29, which may be integrated in module 20. Alternatively, memory device 29 may be an independent device coupled to joint deinterleaver and descrambler 28. Preferably, a HARQ combiner module 30, having an associated HARQ memory 32, is coupled to descrambler 28, for combining the computed and descrambled LLRs with LLRs from previous transmissions, as described above. HARQ combining module 30 is further coupled to a FEC decoder 34. It will be appreciated that joint deinterleaver and descrambler 28 and HARQ combiner module 30 can be configured to apply more than one set of calculations corresponding to different transmission protocols. Preferably, selecting the required calculation is carried out by the management program controlling the operation of module 20. It will be further appreciated that, alternatively, module 20 may include only a deinterleaver, or only a descrambler.

Figure 3:
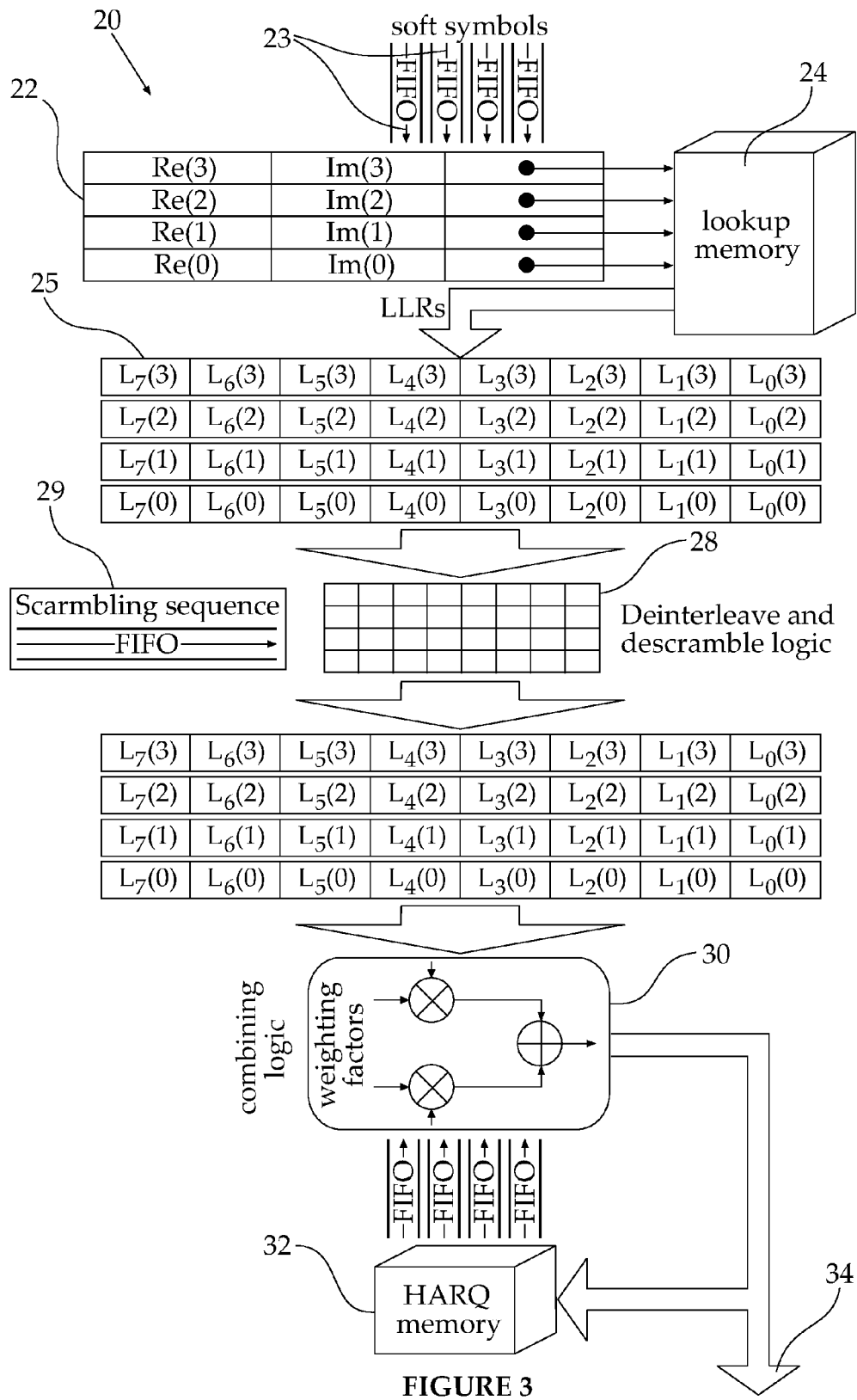
FIG. 3 is a schematic illustration of the combined LLR computation, descrambler and HARQ combining module of FIG. 2, for the case of Z=4.

The operation of joint LLR computation and HARQ combining module 20 is illustrated in FIG. 3, for the case where Z=4. Module 20 stores, in internal register 22, a plurality of soft symbols received from a demodulator (not shown). Preferably, module 20 includes a named pipe (FIFO) 23 to pump the four symbols, for supporting inter-process communication and allowing receipt of the Z soft symbols in one machine cycle. As described above, each soft symbol includes a plurality of bits, half of which are mapped as the real component, and the other half are mapped as the imaginary component.

LLR calculator 24 is configured to perform concurrent computation of multiple LLR values, preferably by means of a look-up memory (not shown). Alternatively, these calculations can be performed simultaneously, for example, using SIMD MAC instructions. Since the number of LLR values in each symbol is a function of the modulation level M, and is equal to $k=\log_2(M)$, LLR calculator 24 calculates k LLR values from each symbol, where k can vary from 1 to 8, in accordance with the modulation level of the symbol, here illustrated as 8.

The soft symbols are arranged according to the definitions of the SIMD instructions, which utilize internal register 22 as operands. For example, soft symbols are arranged in internal register 22 as a matrix having k columns and Z rows. This way LLR calculator 24 can calculate all the LLR values of the soft symbols stored in register 22 in one cycle. Preferably, calculating the LLR values of the Z symbols may be carried out by implementing the 'soft symbols to LLR' functions stored in a Look-Up Table (LUT), which is accessible in parallel per each component (real and imaginary) of each of the Z soft symbols. It is a particular feature of the present invention that accessing the LLR values in the look up table corresponding to the Z soft symbols is carried out in parallel, for example by utilizing 2Z pointers, each wide enough to hold a single component (real and imaginary) of one of the Z soft symbols. Thus, LLR calculator 24 produces a total of kZ LLR values in parallel in one machine cycle. The kZ LLR values are also arranged in internal register 22 according to the definitions of later SIMD instructions that are using internal register 22 as operands. For example, the kZ LLR values are arranged in a virtual two dimensional matrix 25 stored in internal register 22.

Thus, there are one or more sets of instructions for calculating the LLRs supported in the processor, by means of its hardware SIMD architecture and multiple issue pipeline, and by its software tools (compiler, optimizer, linker). One set is selected and a single instruction is selected from the set to be implemented on all the soft symbols in the register each cycle. A single cycle is preferred for the LLR calculation, although a small number of cycles is also acceptable, depending on the exact algorithm of the calculation of the LLR function. The simplest approach described here is pre-computing and storing the LLR function values in a LUT which once is addressed during a certain cycle with a value of the argument of the LLR function (I, Q components of the soft symbols) clocks out the corresponding LLR result in the next cycle. According to a preferred embodiment, the processor further includes a second internal register. In this embodiment, the first internal register is configured for storing the Z soft symbols, and the second internal register is configured for receiving the kZ LLR values, for example, as referred by a pointer to a look-up table. Typically, the pointer is a function of the symbol. Utilizing a second internal register allows erasing the soft symbols of the previous transmission and receiving Z soft symbols of the next transmission into the first register, while additional calculations are performed on the kZ LLR values of the previous transmission stored in the second register.

Joint deinterleaver and descrambler 28 now performs deinterleaving and descrambling on the k LLR values, extracted from each of the Z symbols. If the bits in the symbols were interleaved prior to the transmission, for example, according to a preconfigured BICM scheme, the k LLR values within each of the Z vectors are converted in joint deinterleaver and descrambler 28, to the deinterleaved order, according to the preconfigured BICM scheme. In addition, if the bits in the symbols were scrambled prior to the transmission, the k LLR values within each of the Z vectors are descrambled simultaneously by joint deinterleaver and descrambler 28, according to a pre-computed bit sequence. Preferably, for the sake of simplicity of implementation, descrambling is performed with an 'identity' sequence of 'ones' when the original data was not scrambled. It is a particular feature of the present invention that deinterleaving and descrambling is carried out on all the kZ LLR values in parallel. This requires computation units which perform these instructions on the entire block. Similarly, in case the scrambling sequence is stored in memory device 29, a named pipe (FIFO) is utilized for importing the scrambling sequence for descrambling all the kZ LLR values. Alternatively, the scrambling sequence can be generated internally to the processor, on the fly, using another set of special instructions and a management software code.

HARQ combiner module 30 combines the k LLR values of each of the Z symbols with the corresponding LLRs from previous transmissions stored in HARQ memory 32. The corresponding LLRs from previous transmissions are imported via Z named pipes (FIFO), each of which is large enough to transfer LLR values of one symbol. Alternatively, one large named pipe may be utilized for the entire block of kZ LLR values of the previous transmissions. The combining process is carried out on all the kZ LLR values in parallel, preferably by weighing the quality of the LLR values and then combining them with previous corresponding LLR values. Weighing each current and previous LLR value may be carried out by multiplying each LLR value with a pre-computed real value, usually representing the 'quality' of the current and previous transmission, respectively. The value representing the quality can be a function of the current SNR (Signal to Noise Ratio) or RSSI (Received Signal Strength Indication) (a different value per set). Following the weighing process, the HARQ combiner module 30 adds the corresponding pairs of the multiplication outputs (i.e. $W_{i-1}*LLR_{i-1}+W_i*LLR_i$, where W are usually SNR or RSSI dependent weights, and i is the transmission number).

Following the HARQ combining, the kZ combined LLR values are output for further processing, for example, to HARQ memory 32 for combining with the next transmission, and/or to a FEC decoder 34. For ease of implementation, in case there is no HARQ history, combining can be performed with 'zeros'.

In the case of a non-linear receiver, such as, but not limited to, a maximum likelihood detector (MLD), which outputs LLR values rather than soft symbols, the LLR computation is omitted.

Consequently, the entire process is implemented as a pipelined LLR computation performed on Z complex soft symbols in parallel, resulting in $Zk=Z \log_2(M)$ LLR values, parallel descrambling of these LLR values using a unique or an identity scrambling sequence, and a following parallel weighed HARQ combining with a vector of LLR values of previous transmissions.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A method for processing LLRs, in a receiver, of transmissions over a wireless telecommunication system, the method comprising:
   pre-computing and storing LLR function values in a Look up Table;
   receiving multiple soft symbols;
   selecting a set of appropriate instructions for LLR calculation for said soft symbols;
   arranging said soft symbols in a register of a processor according to said selected instructions;
   selecting an appropriate single instruction from said set of instructions to be implemented by said processor using said soft symbols in said register as operands; and
   calculating, by means of said Look Up Table, multiple LLR values for said multiple soft symbols, in parallel, by means of said selected instruction.

2. The method according to claim 1, wherein said step of selecting includes selecting an appropriate single instruction from said set of instructions to be implemented in each cycle by said processor; and
   wherein said step of calculating is performed in a single cycle.

3. The method according to claim 1, further comprising outputting said multiple LLR values to a FEC decoder.

4. A method for processing LLRs, in a receiver, of transmissions over a wireless telecommunication system, the method comprising:
   receiving multiple soft symbols;
   selecting a set of appropriate instructions for LLR calculation for said soft symbols;
   arranging said soft symbols in a register of a processor according to said selected instructions;
   selecting an appropriate single instruction from said set of instructions to be implemented by said processor using said soft symbols in said register as operands;
   calculating, by a computation unit, multiple LLR values for said multiple soft symbols, in parallel, by means of said selected instruction; and
   further comprising element-wise weighted HARQ combining of each said LLR value with associated LLR values of previous transmissions, in parallel.

5. The method according to claim 1, wherein said step of selecting includes determining a transmission protocol of said multiple soft symbols and selecting an appropriate instruction for said transmission protocol.

6. The method according to claim 1, further comprising simultaneously applying a scrambling sequence of said LLR values.

7. The method according to claim 1, further comprising simultaneously applying deinterleaving elements of said LLR values.

8. An LLR processor for receiving transmissions over a wireless telecommunication system, the LLR processor comprising:
a receiver register for receiving multiple soft symbols;
a register in the LLR processor for holding said soft symbols;
a controller in said processor for selecting an appropriate single instruction for LLR calculation to be implemented by said processor; and
an LLR computation unit, including a Look Up Table of pre-computed LLR function values, for converting said multiple soft symbols into multiple LLR values, in parallel, by means of a single instruction.

9. The LLR processor according to claim 8, further comprising a FEC decoder coupled to said LLR computation unit for receiving said multiple LLR values.

10. The LLR processor according to claim 8, wherein said processor is a Digital Signal Processor (DSP).

11. The LLR processor according to claim 8, further comprising a HARQ combining module performing element-wise weighted HARQ combining of each said LLR value with associated LLR values of previous transmissions, in parallel.

12. The method according to claim 4, wherein said step of calculating includes calculating said multiple LLR values by means of a pre-computed Look Up Table of LLR function values.

13. The LLR processor according to claim 8, further comprising a descrambler configured to simultaneously apply a scrambling sequence to said LLR values.

14. An apparatus for processing LLRs, in a receiver, of transmissions over a wireless telecommunication system, the apparatus comprising:
means for pre-computing and storing LLR function values in a Look up Table;
means for receiving multiple soft symbols;
means for selecting a set of appropriate instructions for LLR calculation for said soft symbols;
means for arranging said soft symbols in a register of a processor according to said selected instructions;
means for selecting an appropriate single instruction from said set of instructions to be implemented by said processor using said soft symbols in said register as operands; and
means for calculating, by means of said Look Up Table, multiple LLR values for said multiple soft symbols, in parallel, by means of said selected instruction.

15. The apparatus according to claim 14,
wherein said means for selecting said appropriate instruction includes means for selecting said appropriate single instruction from said set of instructions to be implemented in each cycle by said processor; and
wherein said calculating is performed in a single cycle.

16. The apparatus according to claim 14, further comprising:
means for outputting said multiple LLR values to a FEC decoder.

17. The apparatus according to claim 14, wherein said means for selecting said appropriate instruction includes:
means for determining a transmission protocol of said multiple soft symbols; and
means for selecting an appropriate instruction for said transmission protocol.

18. The apparatus according to claim 14, further comprising:
means for simultaneously applying a scrambling sequence of said LLR values.

19. The apparatus according to claim 14, further comprising:
means for simultaneously applying deinterleaving elements of said LLR values.

20. A computer program product, comprising:
a non-transitory computer readable storage medium comprising computer-readable program code stored thereon such that the computer readable program code, when executed by at least one processor, causes the at least one processor to:
pre-compute and store LLR function values in a Look up Table;
receive multiple soft symbols;
select a set of appropriate instructions for LLR calculation for said soft symbols;
arrange said soft symbols in a register of a processor according to said selected instructions;
select an appropriate single instruction from said set of instructions to be implemented by said processor using said soft symbols in said register as operands; and
calculate, by means of said Look Up Table, multiple LLR values for said multiple soft symbols, in parallel, by means of said selected instruction.

* * * * *